US010455569B2

(12) United States Patent
Sun et al.

(10) Patent No.: US 10,455,569 B2
(45) Date of Patent: Oct. 22, 2019

(54) DCI DESIGN FOR MULTI-USER SUPERPOSITION TRANSMISSION

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 15/708,687

(22) Filed: Sep. 19, 2017

(65) Prior Publication Data

US 2018/0124754 A1     May 3, 2018

Related U.S. Application Data

(60) Provisional application No. 62/416,661, filed on Nov. 2, 2016.

(51) Int. Cl.
*H04W 72/04* (2009.01)
*H04B 7/0452* (2017.01)
(Continued)

(52) U.S. Cl.
CPC ........ *H04W 72/042* (2013.01); *H04B 7/0452* (2013.01); *H04L 5/0026* (2013.01);
(Continued)

(58) Field of Classification Search
CPC ............. H04W 72/042; H04W 72/046; H04W 72/048; H04W 72/082; H04B 7/0452;
(Continued)

(56) References Cited

U.S. PATENT DOCUMENTS

| 2013/0265955 | A1* | 10/2013 | Kim | H04W 72/04 |
| | | | | 370/329 |
| 2014/0140289 | A1* | 5/2014 | Moulsley | H04L 5/0053 |
| | | | | 370/329 |
| 2018/0198495 | A1* | 7/2018 | Davydov | H04B 7/0452 |

OTHER PUBLICATIONS

Nokia et al., "On Signaling for MUST CASE1/2/3", 3GPP Draft; R1-1609617, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149653, Retrieved from the Internet: URL:http://www.3gpp.org/ftp/Meetings_3GPP_SYNC/RAN1/Docs/ [retrieved on Oct. 9, 2016], 11 pages.
(Continued)

*Primary Examiner* — Christopher M Brandt
(74) *Attorney, Agent, or Firm* — Arent Fox, LLP

(57) ABSTRACT

Wireless networks support MU-MIMO transmission in which a base station transmits multiple spatial layers or spatial streams over a shared downlink resource to multiple UEs. However, UEs participating in the MU-MIMO transmission may need to manage interference associated with spatial streams intended for other users. In an aspect of the disclosure, a method, a computer-readable medium, and an apparatus are provided. The apparatus may be configured to provide an MU-MIMO transmission to a plurality of user UEs over a same set of resource blocks. The apparatus may be configured to generate a DCI message for each UE. The DCI message may indicate a DL grant to each UE and include an MU-MIMO assistance information field that provides each UE with interference information to better decode the spatial layers.

50 Claims, 12 Drawing Sheets

(51) Int. Cl.
*H04L 5/00* (2006.01)
*H04W 72/08* (2009.01)
*H04L 27/34* (2006.01)

(52) U.S. Cl.
CPC .......... *H04L 5/0051* (2013.01); *H04L 5/0055* (2013.01); *H04L 27/3411* (2013.01); *H04W 72/046* (2013.01); *H04W 72/048* (2013.01); *H04W 72/082* (2013.01)

(58) Field of Classification Search
CPC ... H04L 5/0026; H04L 5/0051; H04L 5/0055; H04L 27/3411
See application file for complete search history.

(56) References Cited

OTHER PUBLICATIONS

Partial International Search Report—PCT/US2017/052546—ISA/EPO—dated Dec. 7, 2017.
Qualcomm Incorporated: "Mechanisms for Efficient Operation for MUST", 3GPP Draft; R1-1609976, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051150001, Retrieved from the Internet: URL:http://www.3gpp.org/ftp/Meetings_3GPP_SYNC/RAN1/Docs/ [retrieved on Oct. 9, 2016], 6 pages.
Qualcomm Incorporated: "Multiuser Superposition Schemes", 3GPP Draft; R1-157075, 3rd Generation Partnership Project (3GPP), Mobile Competence Centre; 650, Route Des Lucioles; F-06921 Sophia-Anti Polls Cedex; Franee, vol. RAN WG1, No. Anaheim CA, USA; Nov. 15, 2015, Retrieved from the Internet: URL:http://www.3gpp.org/ftp/Meetings_3GPP_SYNC/RAN1/Docs/ [retrieved on Nov. 15, 2015], 7 pages.
Sharp et al., "Signaling for MUST", 3GPP Draft; R1-167610, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051140754, Retrieved from the Internet: URL:http://www.3gpp.org/ftp/Meetings_3GPP_SYNC/RAN1/Docs/ [retrieved on Aug. 21, 2016], 8 pages.
International Search Report and Written Opinion—PCT/US2017/052546—ISA/EPO—dated Jan. 31, 2018.

* cited by examiner

DCI DESIGN FOR MULTI-USER SUPERPOSITION TRANSMISSION

CROSS-REFERENCE TO RELATED APPLICATION(S)

This application claims the benefit of U.S. Provisional Application Ser. No. 62/416,661, entitled "DCI DESIGN FOR MULTI-USER SUPERPOSITION TRANSMISSION" and filed on Nov. 2, 2016, which is expressly incorporated by reference herein in its entirety.

BACKGROUND

Field

The present disclosure relates generally to communication systems, and more particularly, to downlink control information message design for multi-user superposition transmission (MUST).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Wireless networks support MU-MIMO transmission in which a base station transmits multiple spatial layers or spatial streams over a shared downlink resource to multiple user equipments (UEs). For example, the base station may provide a first downlink control information (DCI) message to a first UE allocating a downlink resource to the first UE for receiving transmissions from the base station. The base station may also provide a second DCI message to a second UE allocating the same downlink resource for receiving transmissions from the base station by the second UE. However, the first DCI message may not indicate that the downlink resource is also allocated for transmissions directed to the second UE. As such, when the first UE receives a transmission from the base station, the first UE may not be aware of interfering signals or may have to do a series of blind detections for potentially interfering signals, and the blind detections may consume resources and battery power.

Although wireless networks support multi-user multiple-input-multiple-output (MU-MIMO) transmission, a user equipment receiving a downlink resource grant may not be aware of other user equipments that may also have received the same downlink resource grant. As such, the user equipment may not be able to accurately and efficiently decode the subsequent downlink transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to determine to provide MU-MIMO transmissions to a plurality of user UEs over a same set of resource blocks. The apparatus may be configured to generate a DCI message for each UE of the plurality of UEs indicating a downlink (DL) grant to each UE. The DCI message may include an MU-MIMO assistance information field. The apparatus may be configured to transmit the generated DCI messages to the plurality of UEs.

In another aspect of the disclosure, a method, a computer-readable medium, and an apparatus are provided. The apparatus may be configured to receive a DCI message indicating a DL grant of a set of resource blocks that may be shared with other UEs in an MU-MIMO transmission. The DCI message may include a MU-MIMO assistance information field. The apparatus may be configured to receive at least one spatial layer of the MU-MIMO transmission based on the MU-MIMO assistance information field. In one aspect, the apparatus may search for control channel decoding candidates based on a search space that is defined in terms of the format of DCI messages. In one particular example, the apparatus searches for decoding candidates in sets of aggregation levels which correspond to DCI format size.

In another aspect of the disclosure, a method, a computer-readable medium, and an apparatus are provided. The apparatus may be configured to receive a DCI message and to attempt to decode the DCI message based on a DCI message length.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
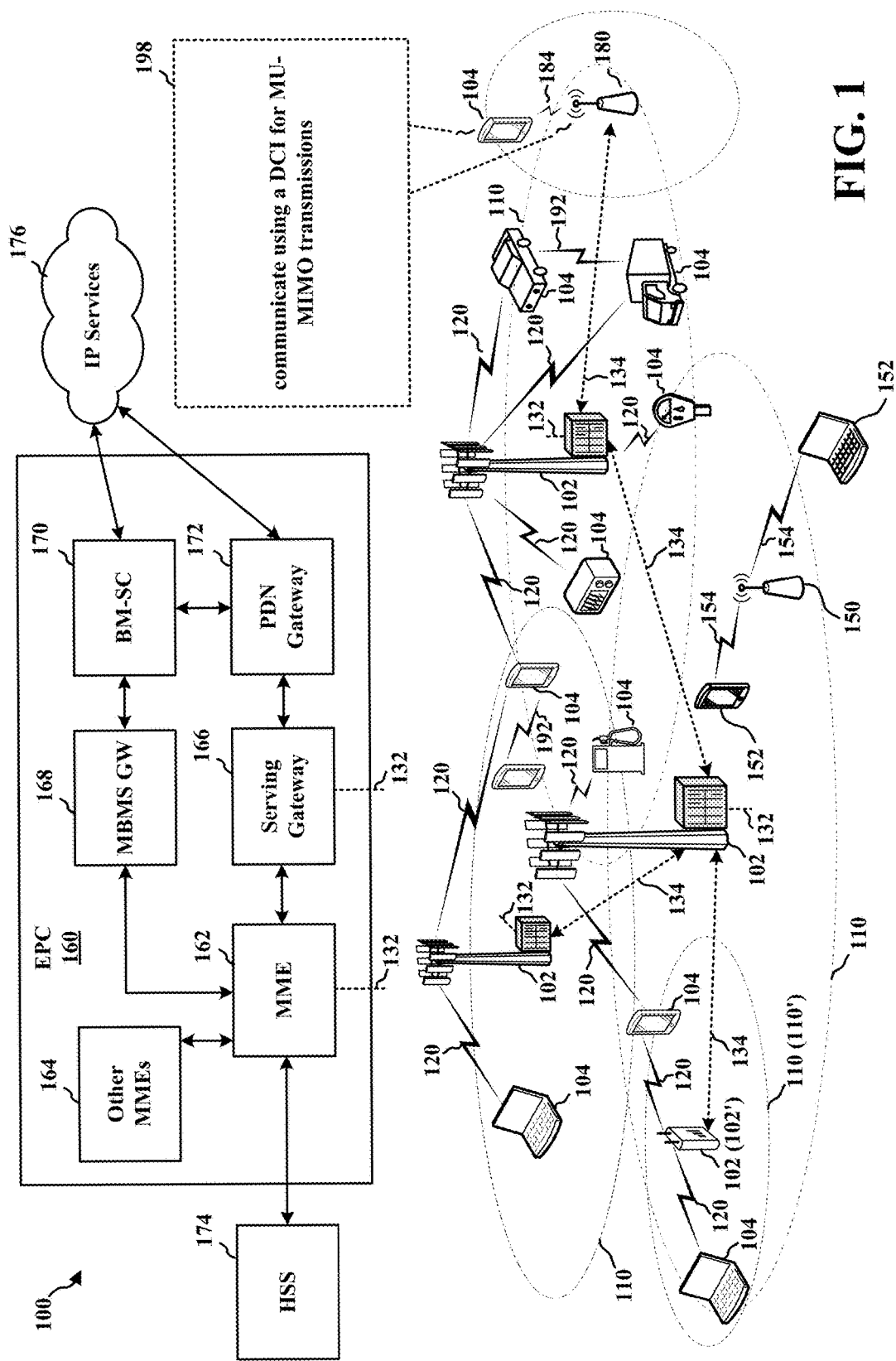
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, as will be apparent to those skilled in the art such concepts may be practiced without the specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The nNodeB (gNB) 180 may operate in millimeter wave (mmW) 180 may operate in mmW frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the base station 180 may be configured to communicate using a DCI for MU-MIMO transmissions (198). In an aspect, the design of the DCI may be utilized in MUST case 3.

Figure 2:
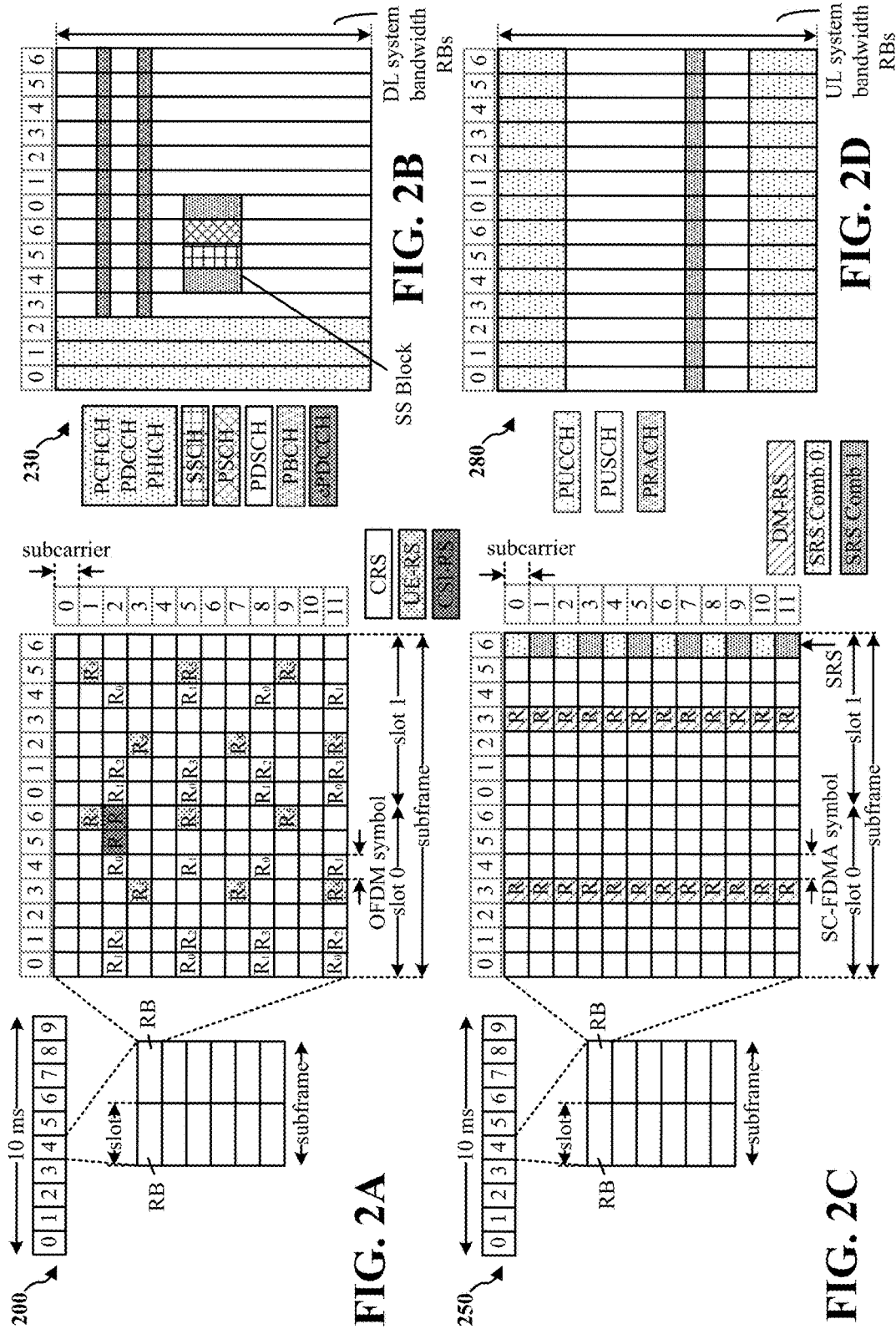
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB) may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by an base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
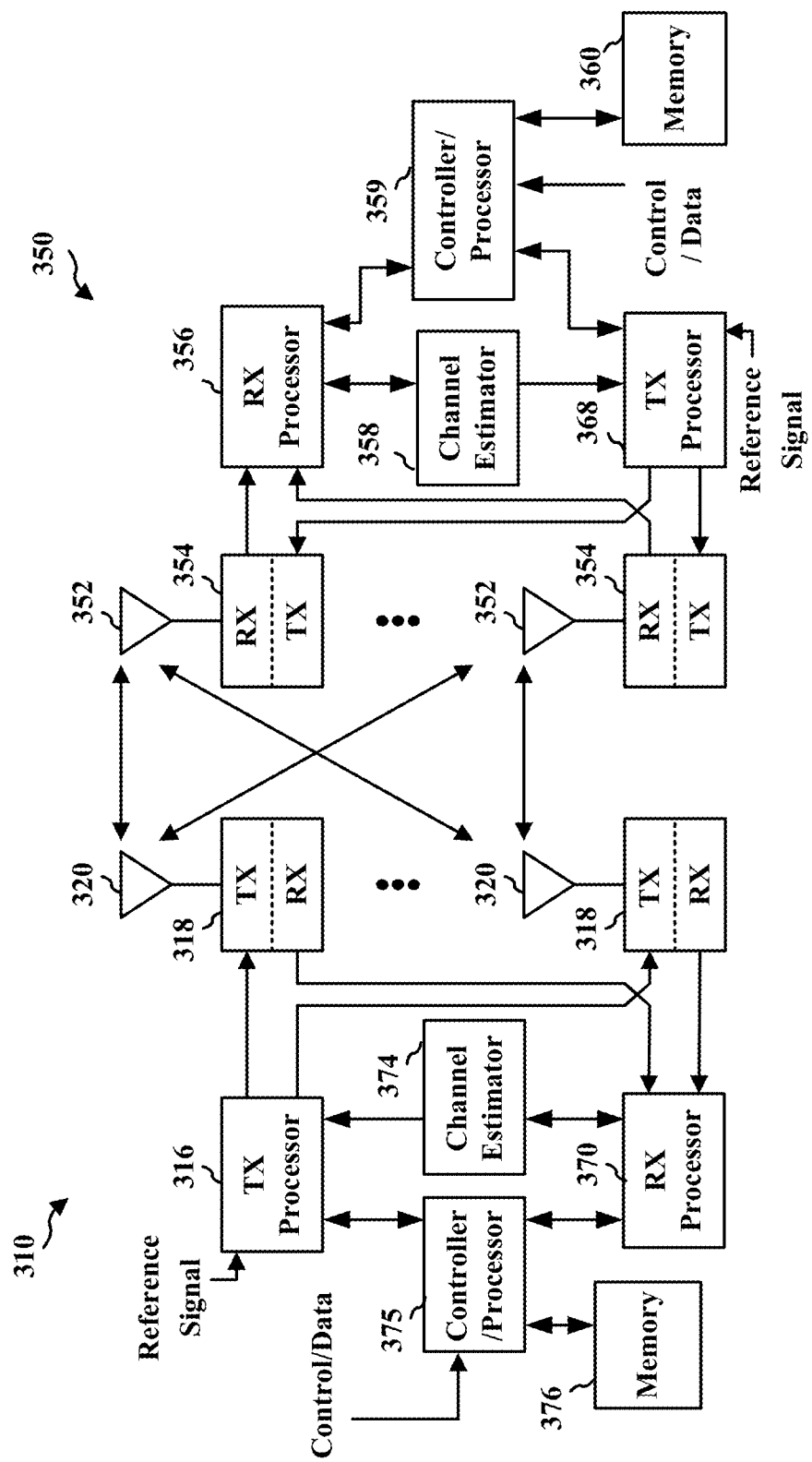
FIG. 3 is a diagram illustrating an example of an evolved Node B (eNB) and user equipment (UE) in an access network.

FIG. 3 is a block diagram of an base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
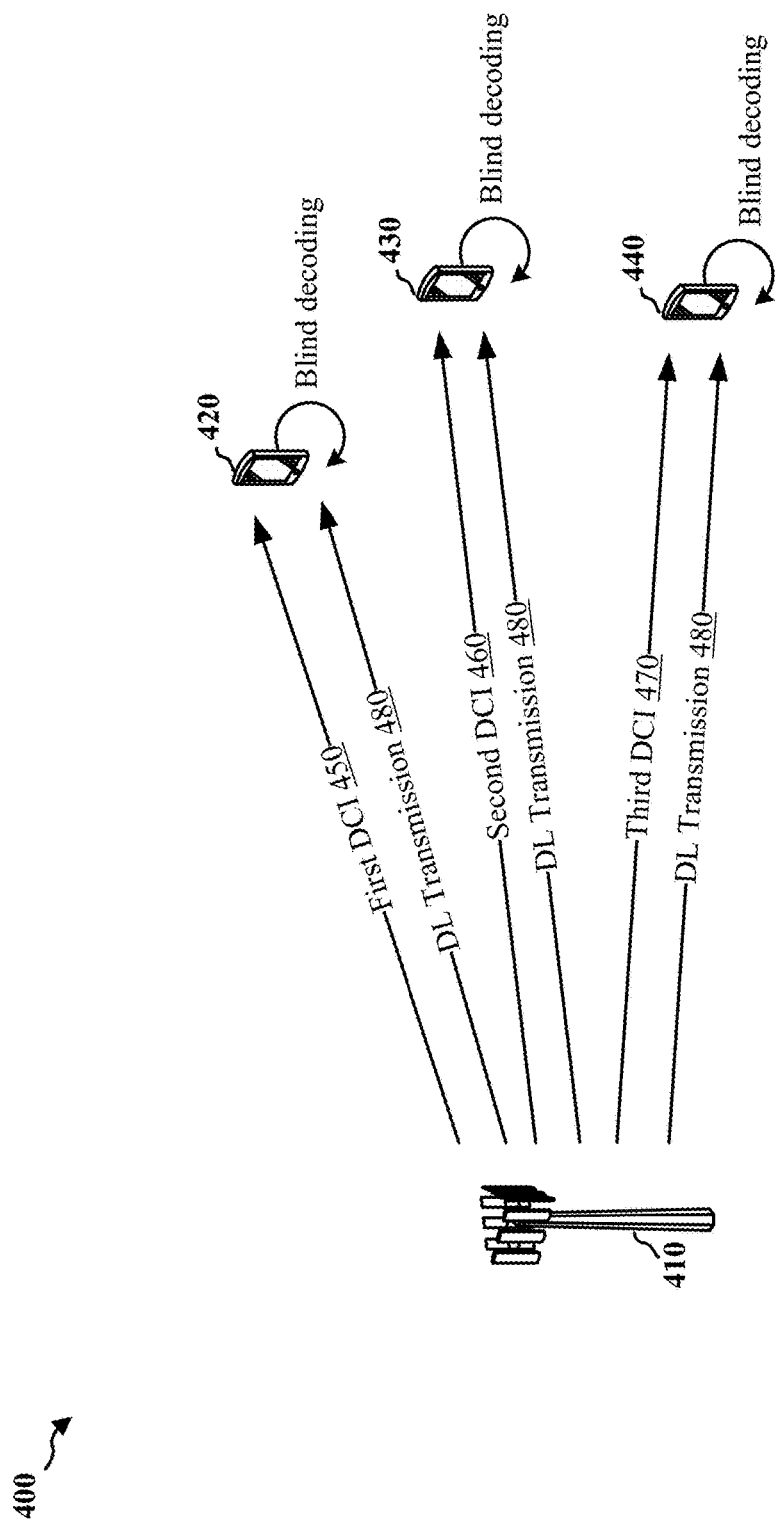
FIG. 4 is a diagram illustrating a method of MU-MIMO transmission.

FIG. 4 is a diagram 400 illustrating a method of MU-MIMO transmission. Referring to FIG. 4, a base station 410 may have different data to transmit to each of the UEs 420, 430, 440 using MU-MIMO transmission. Although FIG. 4 illustrates 3 UEs, a different number of UEs may be provided. Before transmitting the data to the UEs 420, 430, 440 in a downlink transmission 480, the base station 410 may transmit a DCI message (e.g., within a PDCCH) to each of the UEs 420, 430, 440. For example, the base station 410 may transmit a first DCI message 450 to the UE 420, a second DCI message 460 to the UE 430, and a third DCI message 470 to the UE 440. For each corresponding UE, the DCI message may indicate, among other information, a resource assignment for downlink transmission, antenna port(s) at the base station 410 from which the downlink transmission will be sent, a scrambling identity (SCID), and/or a number of spatial layers to be transmitted to the corresponding UE (also known as rank). For example, the first DCI message 450 may indicate a downlink resource assignment (or downlink resource grant) to the UE 420. In an aspect, the downlink resource assignment/grant may include a set of resource blocks or some other set of wireless resources. The first DCI message 450 may also indicate a number of spatial layers (or rank) that the base station 410 will transmit to the UE 420 over the assigned resource, the antenna port(s) at the base station 410 to be used for transmission, and an SCID. The second DCI message 460 may indicate a downlink resource assignment to the UE 430, a number of spatial layers that the base station 410 will transmit to the UE 430 over the assigned resource, the antenna port(s) at the base station 410 to be used for transmission, and an SCID. The third DCI message 470 may indicate a downlink resource assignment to the UE 440, a number of spatial layers that the base station 410 will transmit to the UE 440 over the assigned resource, the antenna port(s) at the base station 410 to be used for transmission, and an SCID. In an aspect, the assigned resource to each of the UEs 420, 430, 440 may be the same resource because the downlink transmission 480 utilizes MU-MIMO transmissions.

TABLE 1

Antenna port(s), SCID, and Layers.

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2

Antenna port(s), SCID, and Layers.

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ (OCC = 2) | 0 | 2 layer, port 7-8, $n_{SCID} = 0$ (OCC = 2) |
| 1 | 1 layer, port 7, $n_{SCID} = 1$ (OCC = 2) | 1 | 2 layer, port 7-8, $n_{SCID} = 1$ (OCC = 2) |
| 2 | 1 layer, port 8, $n_{SCID} = 0$ (OCC = 2) | 2 | 2 layer, port 7-8, $n_{SCID} = 0$ (OCC = 4) |
| 3 | 1 layer, port 8, $n_{SCID} = 1$ (OCC = 2) | 3 | 2 layer, port 7-8, $n_{SCID} = 1$ (OCC = 4) |
| 4 | 1 layer, port 7, $n_{SCID} = 0$ (OCC = 4) | 4 | 2 layer, port 11, 13, $n_{SCID} = 0$ (OCC = 4) |
| 5 | 1 layer, port 7, $n_{SCID} = 1$ (OCC = 4) | 5 | 2 layer, port 11, 13, $n_{SCID} = 1$ (OCC = 4) |
| 6 | 1 layer, port 8, $n_{SCID} = 0$ (OCC = 4) | 6 | 3 layer, port 7-9 |
| 7 | 1 layer, port 8, $n_{SCID} = 1$ (OCC = 4) | 7 | 4 layer, port 7-10 |
| 8 | 1 layer, port 11, $n_{SCID} = 0$ (OCC = 4) | 8 | 5 layer, port 7-11 |
| 9 | 1 layer, port 11, $n_{SCID} = 1$ (OCC = 4) | 9 | 6 layer, port 7-12 |
| 10 | 1 layer, port 13, $n_{SCID} = 0$ (OCC = 4) | 10 | 7 layers, ports 7-13 |
| 11 | 1 layer, port 13, $n_{SCID} = 1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Tables 1 and 2 above illustrate the antenna ports, SCIDs, and spatial layer information that may be included within each of the first, second, and third DCI messages 450, 460, 470. The left column of Table 1 defines the meaning of the 3-bit field when one code word is enabled, and the right column defines the meaning of the 3-bit field when two code words are enabled. Higher-order MU-MIMO may be achieved by expanding the codeword values for the DCI used by a base station to allocate resources for each transmission mode, Higher-order MU-MIMO combinations are provided in Table 2. In some aspects, higher-order MU-MIMO combinations may be particularly useful for distributed antenna systems.

Referring to FIG. 4, the downlink transmission 480 may include demodulation reference signals (DMRS) or other signals encoded using orthogonal cover codes (OCC) for purposes of code division multiplexing (CDM). DMRS may be UE-specific reference signals used for channel estimation (e.g., for estimating the PDSCH) and data demodulation. Because the UEs 420, 430, 440 may share a common downlink resource for MU-MIMO transmission, CDM techniques such as OCC may be utilized to enable the MU-MIMO transmission. CDM may be implemented with a different spreading sequence for each UE that is used to map data for each UE in the time domain, for example. With OCC, OCC sequences (or spreading sequences) may be Walsh Code sequences or other sequences. UEs may support OCC2 (2 code division multiplexed spatial layers using OCC) or OCC4 (4 code division multiplexed spatial layers using OCC). In FIG. 4, the base station 410 may utilize OCC4 because the base station 410 is transmitting to three different UEs, requiring at least 3 spatial layers. Thus, the two spatial layers provided by OCC2 is insufficient.

In one configuration, the first DCI message 450 may indicate that the base station 410 will transmit a first spatial layer in the downlink transmission 480 to the UE 420 using port 7, the second DCI message 460 may indicate that the base station 410 will transmit second and third spatial layers in the downlink transmission 480 to the UE 430 using ports 11 and 13, and the third DCI message 470 may indicate that the base station 410 will transmit a fourth spatial layer in the downlink transmission 480 to the UE 440 using port 8. In an aspect, each of the four spatial layers in the downlink transmission 480 may include DMRS signals encoded using different OCC sequences for the UEs 420, 430, 440. In an aspect, each of the four spatial layers may be transmitted with a different modulation order (e.g., QPSK, 16 QAM, 64 QAM, 256 QAM, etc.).

In FIG. 4, the first, second, and third DCI messages 450, 460, 470 include information about the respective spatial layers to be transmitted to the respective UE 420, 430, 440 but do not include information about the other spatial layers to be transmitted to the other UEs. For example, the first DCI message 450 includes information about the first spatial layer to be transmitted to the UE 420 but does not include information about the second and third spatial layers to be transmitted to the UE 430 or the fourth spatial layer to be transmitted to the UE 440. When the UE 420 attempts to decode the first spatial layer, the UE 420 may have little to no information related to the other spatial layers. In an attempt to cancel interference from the other spatial layers, the UE 420 may perform blind detection of the other spatial layers, iterating through different modulation orders that may be used to transmit the other spatial layers. The results from the blind detection may be used to partially cancel interference from the other spatial layers to improve the decoding of the first spatial layer. Such blind detection, however, may increase processing time and consume more battery power. As such, a need exists to provide information to each UE regarding spatial layers transmitted to other UEs of a MU-MIMO transmission to improve channel estimation and data decoding.

With OCC, different spatial layers for MU-MIMO transmission may be supported. For example, OCC2, having two OCC sequences, supports 2 spatial layers. In the example, the two spatial layers supported may be transmitted by two UE, each transmitting a single spatial layer. One of the two UEs transmitting a single spatial layer may be the respective UE and another UE, the respective UE may have a "self-rank," i.e., the number of layers transmitted by the respective UE. The self-rank of the respective UE may be a self-rank 1 transmission. The "rank," i.e., the number of layers transmitted by another UE may be a rank 1 transmission. The rank of a transmission is the number of layers transmitted. Accordingly, the two rank 1 transmissions (e.g., self-rank 1 and rank 1) may be supported by OCC2, having two OCC sequences, supports 2 spatial layers.

In another example, OCC4, having four OCC sequences, supports 4 spatial layers. In one aspect, OCC4 supports self-rank 1, and optionally one, two, or three other rank 1 transmissions. In another aspect, OCC4 supports self-rank 1, and optionally rank 2, and another rank 1 transmission. In another aspect, OCC4 supports self-rank 2 and a rank 2 transmissions. When a UE receives a DL grant via a DCI message, the DCI message may include additional information (e.g., within an extra field), to indicate information about additional spatial layer transmissions to other UEs employing the same resource.

Figure 5:
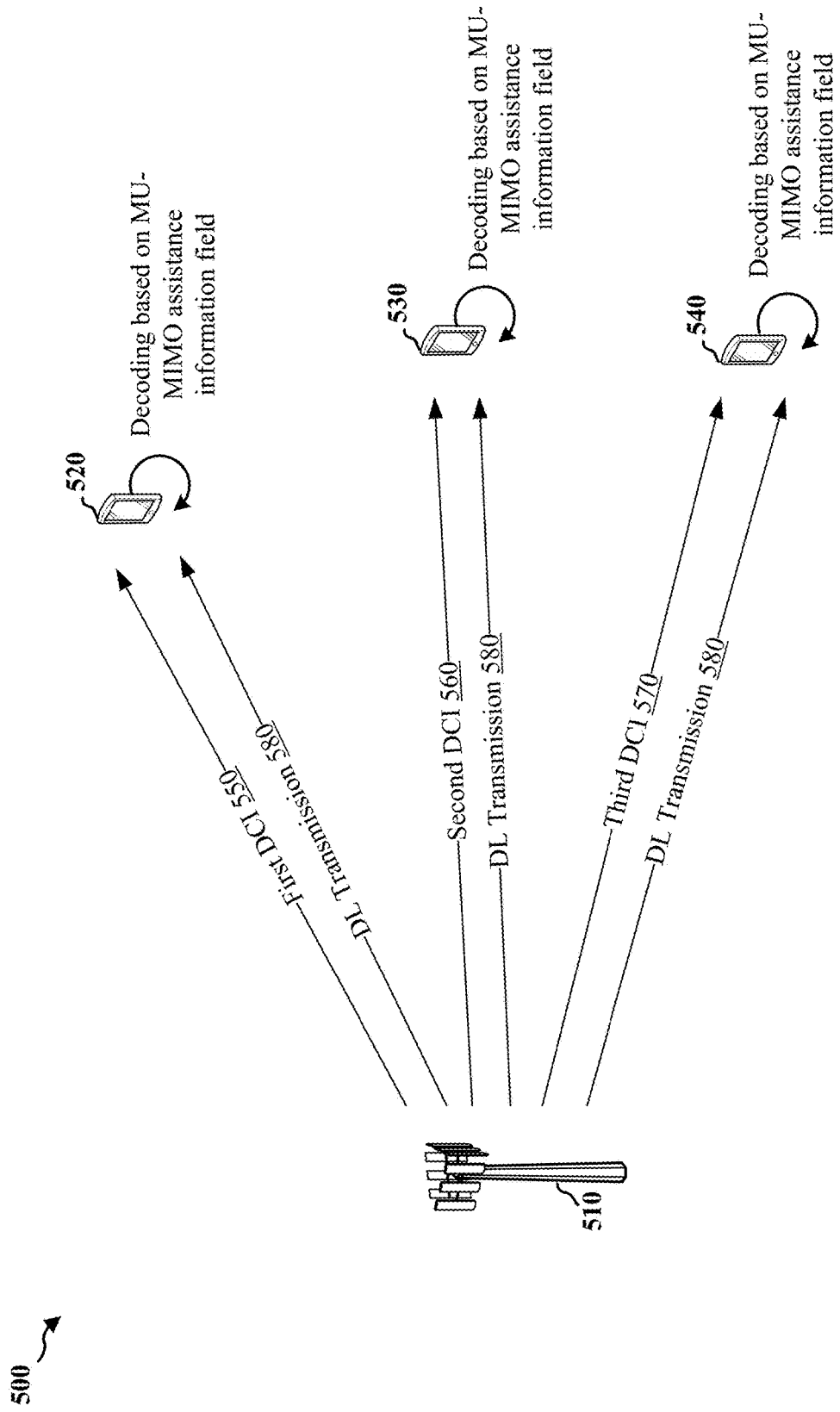
FIG. 5 is a diagram illustrating an exemplary method of MU-MIMO transmission.

FIG. 5 is a diagram 500 illustrating an exemplary method of MU-MIMO transmission. Referring to FIG. 5, a base station 510 may have different data to transmit to each of the UEs 520, 530, 540 using a MU-MIMO transmission. Although FIG. 5 illustrates 3 UEs, a different number of UEs may be provided for in the MU-MIMO transmission. Before transmitting the data to the UEs 520, 530, 540 in a downlink MU-MIMO transmission 580, the base station 510 may transmit a respective DCI message to each of the UEs 520, 530, 540. For example, the base station 510 may transmit a first DCI message 550 to the UE 520, a second DCI message 560 to the UE 530, and a third DCI message 570 to the UE 540. Similar to FIG. 4, each of the DCI messages may indicate, for each corresponding UE, information from Tables 1 and 2 above, such as a resource assignment for a downlink transmission, antenna port(s) at the base station 510 from which the downlink transmission is to be sent, a SCID, a number of spatial layers allocated to the corresponding UE, and/or other information. For example, the first DCI message 550 may indicate a downlink resource assignment (or downlink resource grant) to the UE 520. In an aspect, the downlink resource assignment/grant may include a set of resource blocks or some other set of wireless resources. The first DCI message 550 may also indicate a number of spatial layers allocated by the base station 510 for transmission to the UE 520 over the assigned resource, the antenna port(s) at the base station 510 to be used for the transmission, and an SCID. The second DCI message 560 may indicate a downlink resource assignment to the UE 530, a number of spatial layers allocated by the base station 510 to the UE 530 for transmission over the assigned resource, the antenna port(s) at the base station 510 to be used for the transmission, and an SCID. The third DCI message 570 may indicate a downlink resource assignment to the UE 540, a number of spatial layers allocated by the base station 510 for transmission to the UE 540 over the assigned resource, the antenna port(s) at the base station 510 to be used for the transmission, and an SCID. In an aspect, the resource assigned to each of the UEs 520, 530, 540 may be the same resource for the downlink MU-MIMO transmission 580.

Each DCI message for a respective UE may also include additional information about the other spatial layers assigned to other UEs. In an aspect, the additional information may be included within a field, such as a MU-MIMO assistance information field or another field. That is, the MU-MIMO assistance information field may indicate spatial layer assignments and the use of OCC in the MU-MIMO transmissions.

In one configuration, all of the spatial streams to be transmitted in the downlink MU-MIMO transmission 580 may have the same SCID (or $n_{scid}$). In an aspect, each grant may include the $n_{scid}$. In an aspect, the first DCI message 550 may include the additional information associated with the spatial streams. In an aspect, the additional information may be in a MU-MIMO assistance information field. In another aspect, the additional information may indicate that OCC is being used in the downlink MU-MIMO transmission 580. In another aspect, the additional information may indicate, for the other spatial layers not assigned to the UE 520, whether the other spatial layers are being used or assigned to other UEs. For example, in OCC4, if the UE 520 is assigned a first spatial layer (self-rank 1), then three spatial layers may potentially be assigned to other UEs. For example, the second, third, and fourth spatial layers may be assigned to the UEs 530, 540. Each spatial layer may have 5 states. One state is whether the spatial layer is empty (or unassigned). Four states may indicate the modulation order of the spatial layer when the spatial layer is occupied by a potentially interfering transmission. The modulation order may be QPSK, 16 QAM, 64 QAM, 256 QAM, or some other modulation type. To indicate the 5 different states, 3 bits may be used, and 9 total bits may be used to indicate 5 different states for 3 spatial layers. In another example, in OCC4, if the UE 520 is assigned the first and second spatial layers (self-rank 2), then only two other layers may be assigned to the UEs 530, 540, and only 6 bits may be needed to convey the state information for the two spatial layers. In another example, in OCC2, if the UE 520 is assigned the first spatial layer (self-rank 1), then only one other spatial layer may be assigned, and only 3 bits may be needed to convey the state information for the other spatial layer. Depending on the number of other spatial layer to be assigned, the number of bits needed to represent the state information may vary. For DCI design, however, a fixed DCI length may be needed. In the most conservative design, 9 bits may be added to the DCI message length. If fewer than 9 bits are used, then the remaining bits may be reserved for other purposes.

Adding 9 bits to the DCI message may create excessive overhead. Different embodiments are provided to reduce the size of the additional information. For example, in another embodiment, the additional information for the other spatial layers may be encoded together. Assuming 5 states per spatial layer and three spatial layers, 125 (5×5×5) states may be used to indicate all of the different states for each spatial layer. In this embodiment, 7 bits may be used to indicate 125 states, representing a saving of 2 bits saving from the previous embodiment using 9 bits.

In another embodiment, the number of states may be reduced. For example, instead of 5 states, each spatial layer of the other layers may be associated with 4 states: (1) on/off or assigned/unassigned, (2) QPSK, (3) 16 QAM, and (4) 64 QAM and higher. In this embodiment, 64 QAM and 256 QAM may be combined. The combination may result in some performance loss due to loss of information, but the loss may be manageable because 64 QAM and 256 QAM MU-MIMO interference may not be distinguishable except at a high SNR. This embodiment may also include higher modulation orders, e.g., 1024 QAM, in state 4. In this embodiment, 6 bits may be needed to provide state information for 3 spatial layers, representing a savings of 3 bits to provide the state information. In an aspect, when 6 bits are used to represent the state information, the reduced number of states may only be needed under the OCC4 and self-rank 1 scenario. For other scenarios (e.g., OCC4 and self-rank 2; or OCC2 and self-rank 1), sufficient bits are available to provide 5 states per spatial layer.

In another embodiment, the number of states may be further reduced. For example, the modulation order information may be omitted from the additional information. In this embodiment, the additional information may indicate whether the one or more other spatial layers, e.g., of the three other layers, are assigned or unassigned (on or off). As such, 3 bits may be used to provide the assignment information. In an aspect, when 3 bits are used to represent the state information, the 3 bits may still be used to indicate the full 5 states in the case of OCC2 and self-rank 1. However, under OCC4 and self-rank 1 or self-rank 2, there may not be a sufficient number of bits to provide modulation order information for each spatial layer.

In another configuration, the first DCI message 550 may include the additional information, and the spatial streams may have different SCIDs (or $n_{scid}$) or use non-orthogonal DMRS ports. As shown in Tables 1 and 2, MU-MIMO support provides two $n_{scid}$ values (0 or 1) to be used for non-orthogonal operation. In this configuration, for OCC4, there may be an additional 4 spatial layers, each with 5 states, resulting in 12 additional bits assuming 3 bits for each spatial layer, or 21 total bits (e.g., 9 bits+12 additional bits). Joint encoding of the states may require 625 states (5×5×5×5) which may be represented by 10 bits. For OCC2, there may be two additional spatial layers. If each spatial layer has 5 states, then 6 additional bits may be needed (assuming 3 bits for each spatial layer), or 5 additional bits if the state information is jointly encoded (5×5=25 states).

When multiple $n_{scid}$s are used, e.g., a different scrambling identity for each spatial layer, the base station 510 may assume that the over-the-air (OTA) channel naturally suppresses interfering signals to UEs. For example, when a first spatial layer with $n_{scid}$=1 is sent to the UE 520, a second spatial layer arriving at the UE 520 with $n_{scid}$=0 may have a weak signal and may not cause excessive interference to the first spatial layer. In this example, the second spatial layer with $n_{scid}$=0 may be ignored. As such, in one configuration, the first DCI message 550 need not include any information regarding the $n_{sc}$id of any spatial layers assigned to other UEs.

In another configuration, the first DCI message 550 may include information indicating an existence of other spatial layers with a different SCID (or $n_{sc}$id). For example, in the configuration, the other spatial layers may each have the same SCID (or $n_{scid}$), which may be different from the SCID (or $n_{scid}$) of the first spatial layer. In an aspect, a bitmap may be used to indicate the existence of one or more spatial layers with the other SCID. For example, 4 bits may be used for OCC4 and 2 bits may be used for OCC2 to indicate the presence of another spatial layer with a different SCID. In the OCC2 case, assuming a fixed number of 4 bits are used, the remaining 2 bits may be reserved. In this configuration, the modulation order for the spatial layers with the different SCID may be omitted because signals with the different SCID may be sufficiently suppressed such that having the modulation order information may not increase demapper performance by a significant amount. (When a base station uses multiple $n_{scid}$ (both 0 or 1) in a MU-MIMO case, the base station may need to make sure there is enough isolation between the spatial layers. Other examples may not provide $n_{scid}$ information. The performance loss may be acceptable.)

In another configuration, instead of indicating per spatial layer usage for a different SCID, the first DCI message 550 may use 1 bit to indicate whether a different SCID is used in any of the other spatial layers.

Referring to FIG. 5, the downlink MU-MIMO transmission 580 may include DMRS or other signals encoded using OCC. Because the UEs 520, 530, 540 may share a common downlink resource for MU-MIMO transmission, CDM techniques such as OCC may be utilized to enable MU-MIMO transmission. In FIG. 5, the base station 510 may utilize OCC4 because the base station 510 is transmitting to 3 different UEs, requiring at least 3 spatial layers.

In one example, the first DCI message 550 may indicate that the base station 510 will transmit a first spatial layer in the downlink MU-MIMO transmission 580 to the UE 520 using port 7, the second DCI message 560 may indicate that the base station 510 will transmit the second and third spatial layers in the downlink MU-MIMO transmission 580 to the UE 530 using ports 11 and 13, and the third DCI message 570 may indicate that the base station 510 will transmit the fourth spatial layer in the downlink MU-MIMO transmission 580 to the UE 540 using port 8. In an aspect, the downlink MU-MIMO transmission 580 may include DMRS signals encoded using four different OCC sequences for the UEs 520, 530, 540. In an aspect, each of the four spatial layers may be transmitted with a different modulation order (e.g., QPSK, 16 QAM, 64 QAM, 256 QAM, etc.).

Unlike in FIG. 4, the first DCI message 550, for example, may also include the additional information about the other spatial layers to be transmitted to the UEs 530, 540. For example, the first DCI message 550 may include information about the first spatial layer to be transmitted to the UE 420 and additional information (e.g., within a MU-MIMO assistance information field) about the second and third spatial layers to be transmitted to the UE 530 and the fourth spatial layer to be transmitted to the UE 540. The additional information may indicate that the second and third spatial layers are assigned (e.g., to the UE 530) and have modulation orders QPSK and 16 QAM, respectively. The additional information may further indicate that the fourth spatial layer is assigned (e.g., to the UE 540) and has a modulation order of 64 QAM. In an aspect, the assigned UE, e.g., UE 540 may be identified. In another aspect, the fourth spatial layer being assigned may be indicated without identifying the assigned UE. When the UE 520 attempts to decode the first spatial layer, the UE 520 may use the additional information received in the first DCI message 550 to assist with decoding. For example, the UE 520 may attempt to cancel the interference from the other spatial layers using the received additional information. In an aspect, spatial streams may have different SCIDs (or $n_{scid}$). When multiple $n_{scid}$s are used, the OTA channel may naturally suppresses interfering signals to UEs. Accordingly, a UE may assume a signal that is not suppressed is intended for the particular UE. Thus, blind detection may be avoided. Unlike the UE 420, the UE 520 may not need to perform blind detection, or may have less blind detection to perform, in order to cancel the other spatial layers. The cancellation may include a symbol level cancellation or other types of cancellation (e.g., joint de-mapping across multiple spatial layers).

Increasing the amount of information conveyed within a DCI message also increases the length of the DCI message. In order to decode the DCI message, a UE receiving the DCI message may determine a number of decoding candidates (e.g., PDCCH decoding candidates) for each aggregation level (e.g., aggregation level 1, 2, 4, or 8). An aggregation level corresponds to a number of CCEs, REGs, and/or bits aggregated for transmitting the PDCCH. Each aggregation level may have 2, 4, or 6 decoding candidates (that represent a set of consecutive CCEs). The number of decoding candidates may not be determined based on the length of the DCI message but determined based on the aggregation level. For example, a fixed number of decoding candidates may be defined for each aggregative level. In some instances, however, when the DCI message has additional information, the coding rate may become too high for decoding. For example, aggregation level 1 may not be decodable because insufficient bits are provided for decoding. For example, insufficient bits might be provided for decoding an LTE communication system as such systems evolve. An aspect may add more information bits to the DCIs, and as a result, the coding rate becomes higher. Higher coding rate may be harder to decode. When the coding rate exceeds level 1, the DCI may be un-decodable. The DCI may be decoded if larger Aggregation Level (AL) is used and the coding rate is reduced. The AL may define the coding gain of the DCI. The AL may be in number of CCEs to carry the DCI. The AL may be 1, 2, 4, or 8 in some examples. The larger the AL, the further away the DCI may be transmitted in the cell. In an aspect, the search space (the set of decoding candidates for each AL) changes as a function of DCI length. When the DCI length is higher, the search space may include more decoding candidates at high AL, and lower DCI length may use a reduced number of decoding candidates with low AL (which may be close to not decodable).

Alternatively, the decoding candidates may be determined as a function of DCI length. For example, after receiving a DCI message, the UE may determine the DCI length, which may be indicated in the DCI message or elsewhere in the PDCCH. The UE may determine a set of aggregation levels that may be used based on the DCI length. After determining the set of aggregation levels, the UE may determine the number of decoding candidates associated with each aggregation level. Subsequently, the UE may attempt to decode the DCI message based on the set of aggregation levels and the decoding candidates. That is, the UE may be informed of the number of OFDM symbols within a control region of a subframe that carries the PDCCH, and the UE may find the UE's PDCCH (or DCI message) by monitoring a set of decoding candidates in every subframe and attempt to demask each set of decoding candidates using the UE's radio network temporary identifier (RNTI). If no cyclic redundancy check (CRC) error is detected, then the UE considers the decoding attempt successful and reads the DCI message within the successfully decoded candidate.

In the foregoing examples, the additional information may be inserted into a DCI message of Format 2C, 2D, or any other existing or new format.

Figure 6:
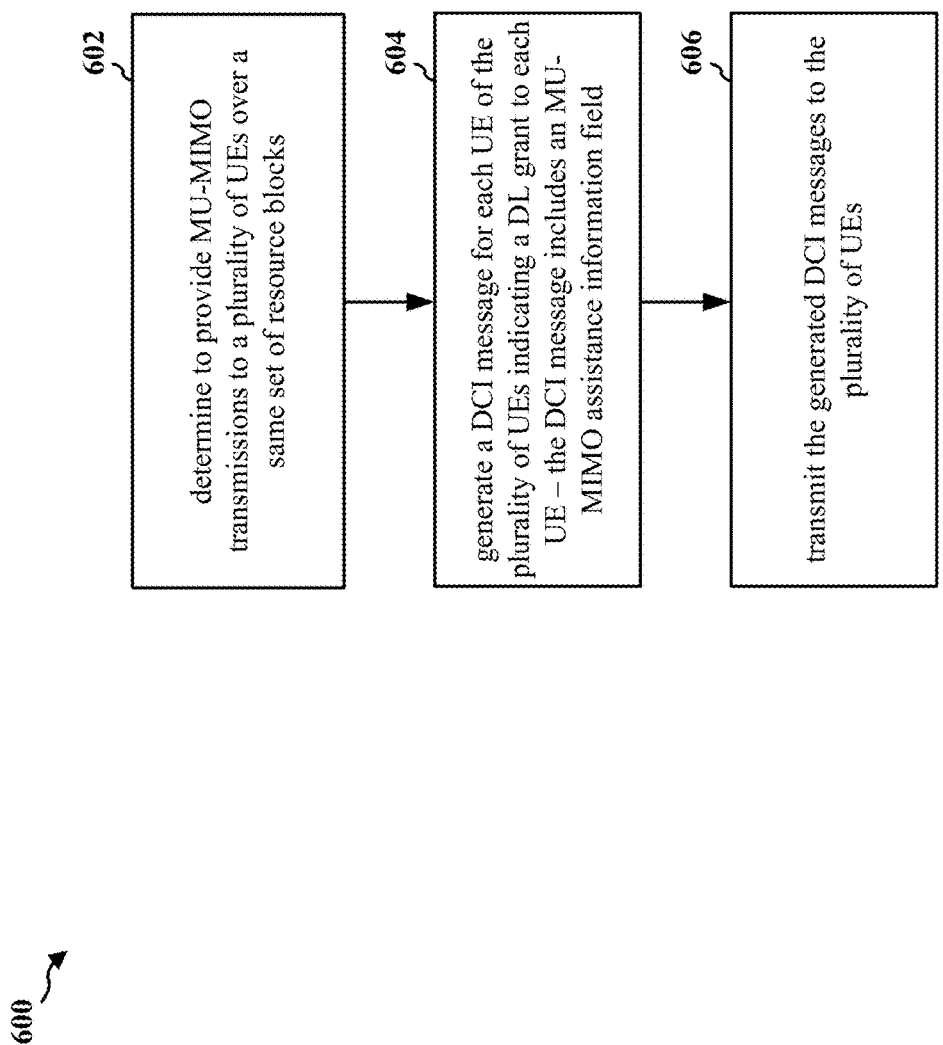
FIG. 6 is a flowchart of a method of wireless communication.

FIG. 6 is a flowchart 600 of a method of wireless communication. The method may be performed by an base station (e.g., the base station 510). At 602, the base station may determine to provide a MU-MIMO transmission to a plurality of UEs over a same set of resource blocks. For example, referring to FIG. 5, the base station may correspond to the base station 510. The base station 510 may determine to provide the MU-MIMO transmission to UEs 520, 530, 540 over a same set of wireless resources (or resource blocks). The base station 510 may determine to provide the MU-MIMO transmission by determining that the base station 510 supports MU-MIMO transmission and by determining that the base station 510 has data to transmit to each of the UEs 520, 530, 540. (In an aspect, the base station may also determine that the UEs support MU-MIMO.)

At 604, the base station may generate a DCI message for each UE of the plurality of UEs. Each DCI message may indicate a DL grant to a respective UE. Each DCI message may include an MU-MIMO assistance information field. For example, referring to FIG. 5, the base station 510 may generate the first DCI message 550 for the UE 520, the second DCI message 560 for the UE 530, and the third DCI message 570 for the UE 540. The base station 510 may generate the first DCI message 550, for example, by determining a set of DL resources allocated to the UE 520, by determining information about the spatial layers assigned to the UE 520, and by determining information about the other spatial layers, if any, assigned to the other UEs 530, 540 associated with the MU-MIMO transmission. The base station 510 may insert the determined information into the first DCI message 550. A similar process may be performed to generate the remaining DCI messages. In an aspect, the base station may determine how many bits are needed and what information to include in the DCI using the systems and methods described herein.

At 606, the base station may transmit the generated DCI messages to the plurality of UEs. For example, referring to FIG. 5, the base station 510 may transmit the first DCI message 550 to the UE 520, the second DCI message 560 to the UE 530, and the third DCI message 570 to the UE 540.

Figure 7:
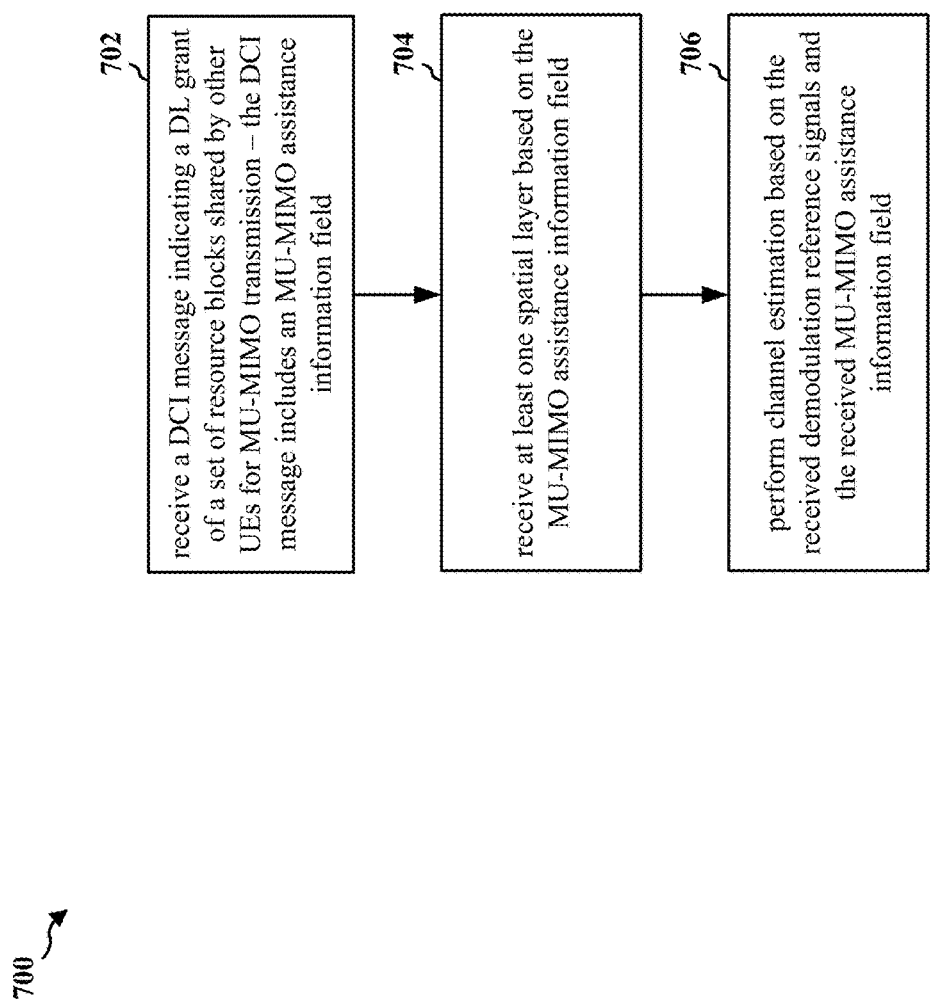
FIG. 7 is a flowchart of a method of wireless communication.

FIG. 7 is a flowchart 700 of a method of wireless communication. The method may be performed by a UE (e.g., the UE 520). At 702, the UE may receive a DCI message indicating a DL grant of a set of resource blocks shared by other UEs for MU-MIMO transmission. The DCI message may include an MU-MIMO assistance information field. For example, referring to FIG. 5, the UE may correspond to the UE 520. The UE 520 may receive the first DCI message 550 indicating a DL grant of a set resource blocks shared by UEs 520, 530, 540 for MU-MIMO transmission. The first DCI message 550 may include an MU-MIMO assistance information field. In an aspect, the UE may know a DCI message is intended for the UE by using a de-scrambling code for the UE. The message may also be CRC checked. When a CRC check for a DCI message descrambling using a de-scrambling code for the UE passes then the DCI message is intended for the UE.)

At 704, the UE may receive at least one spatial layer based on the MU-MIMO assistance information field. For example, referring to FIG. 5, the UE 520 may receive at least one spatial layer in the downlink MU-MIMO transmission 580 by performing interference cancellation based on the MU-MIMO assistance information field. The DCI information received may indicate the spatial layer is assigned to the UE and other layers are assigned to other UEs. Accordingly, the UE may perform interference cancellation as appropriate.

Generally speaking, a receiver may need to have the correct channel and interference information to optimally receive the signal (or provide for an improved ability to receive the signal). The legacy LTE MU-MIMO support did not directly provide the interference information. Unless the UE performs complex interference estimation, the interference knowledge used to construct the equalizer may be wrong. The MU-MIMO assistance information field may provide a UE with additional information about interference. The information may allow for proper equalizer or interference cancellation to be performed.

At 706, the at least one spatial layer may include a DMRS, and the UE may perform channel estimation based on the received at least one spatial layer. For example, referring to FIG. 5, the UE 520 may receive the at least one spatial layer in the downlink MU-MIMO transmission 580, and the at least one spatial layer may include a DMRS dedicated for the UE 520. The first DCI message 550 may include information (e.g., in the MU-MIMO assistance information field) indicating whether one or more other spatial layers were transmitted to the UEs 530, 540 and the modulation order of the one or more other spatial layers. The UE 520 may attempt to cancel the other spatial layers and cancel the interference from the one or more other spatial layers. After attempting to cancel the interference, the UE 520 may attempt to decode the DMRS for the UE 520 and perform channel estimation based on the decoded DMRS. The UE 520 may also perform data demodulation based on the decoded DMRS.

Figure 8:
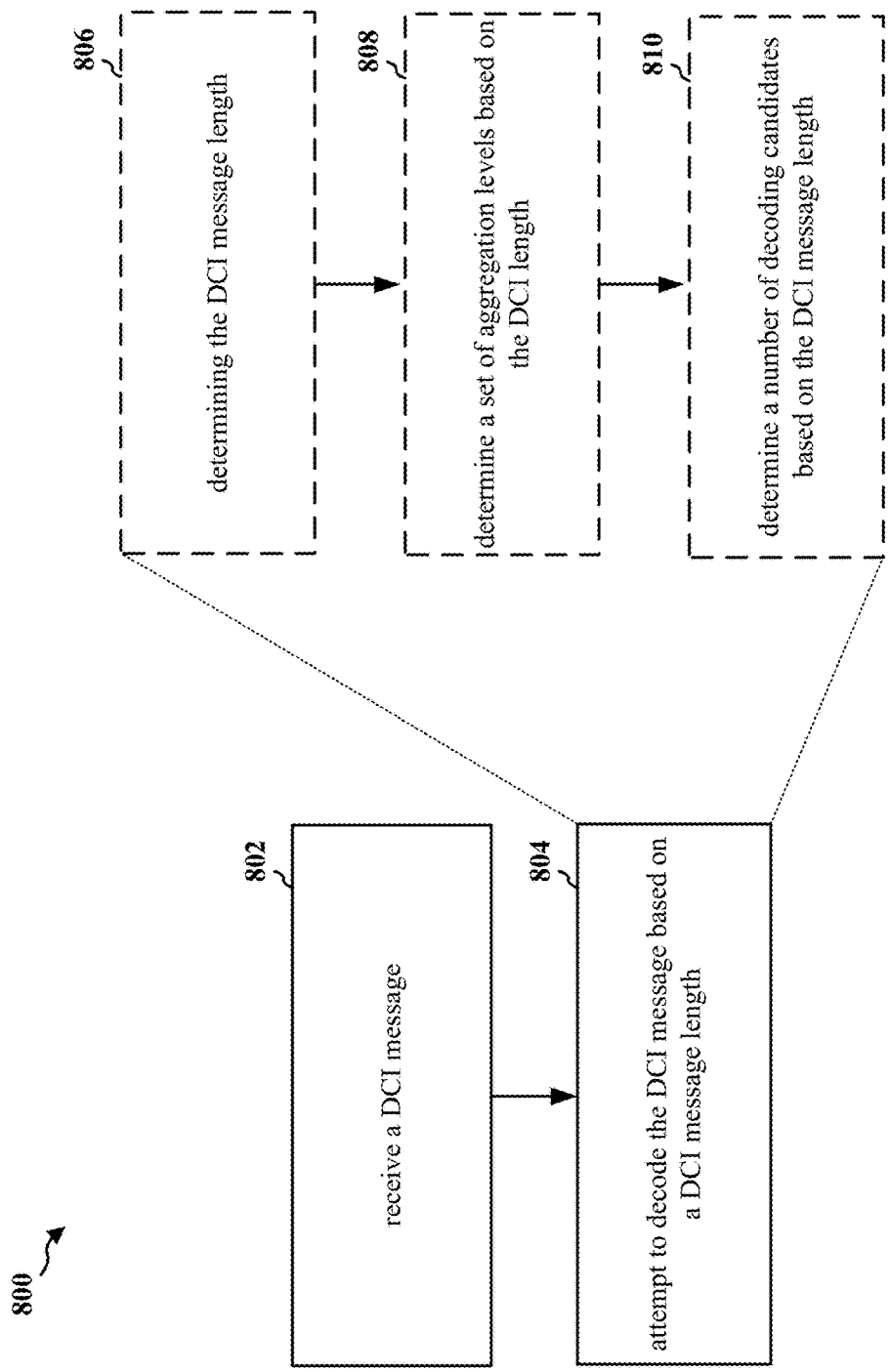
FIG. 8 is a flowchart of a method of wireless communication.

FIG. 8 is a flowchart 800 of a method of wireless communication. The method may be performed by a UE (e.g., the UE 520). At 802, the UE may receive a DCI message. For example, referring to FIG. 5, the UE 520 may receive the first DCI message 550. For example, the UE may receive a DCI message within one or more control channel elements.

At 804, the UE may attempt to decode the DCI message based on a DCI length. In one configuration, the UE may attempt to decode the DCI message by determining the DCI length (at 806), by determining a set of aggregation levels based on the DCI length (at 808), and by determining a number of decoding candidates based on the DCI message length (at 810). For example, referring to FIG. 5, the UE 520 may attempt to decode the first DCI message 550 by determining the DCI length, which may be indicated by the first DCI message 550. For example, the first DCI message 550 may include a DCI length field. The DCI length field may indicate the length DCI length. Based on the determined DCI length, the UE 520 may determine that aggregation levels 2, 4, and 6 may have been used. Subsequently, the UE 520 may determine a number of decoding candidates (e.g., PDCCH decoding candidates) based on the set of aggregation levels. The UE 520 may then attempt to decode the first DCI message 550 based on the determined number of decoding candidates.

The UE may know how long the DCI is based on a configuration. An aspect may change the search space composition using the DCI length. When the DCI is longer, an aspect may allow for high AL decoding and for reducing or not attempting low AL decodings. The total number of decodings may be limited by hardware. An aspect having a search space change, as described herein, may use hardware more efficiently.

Figure 9:
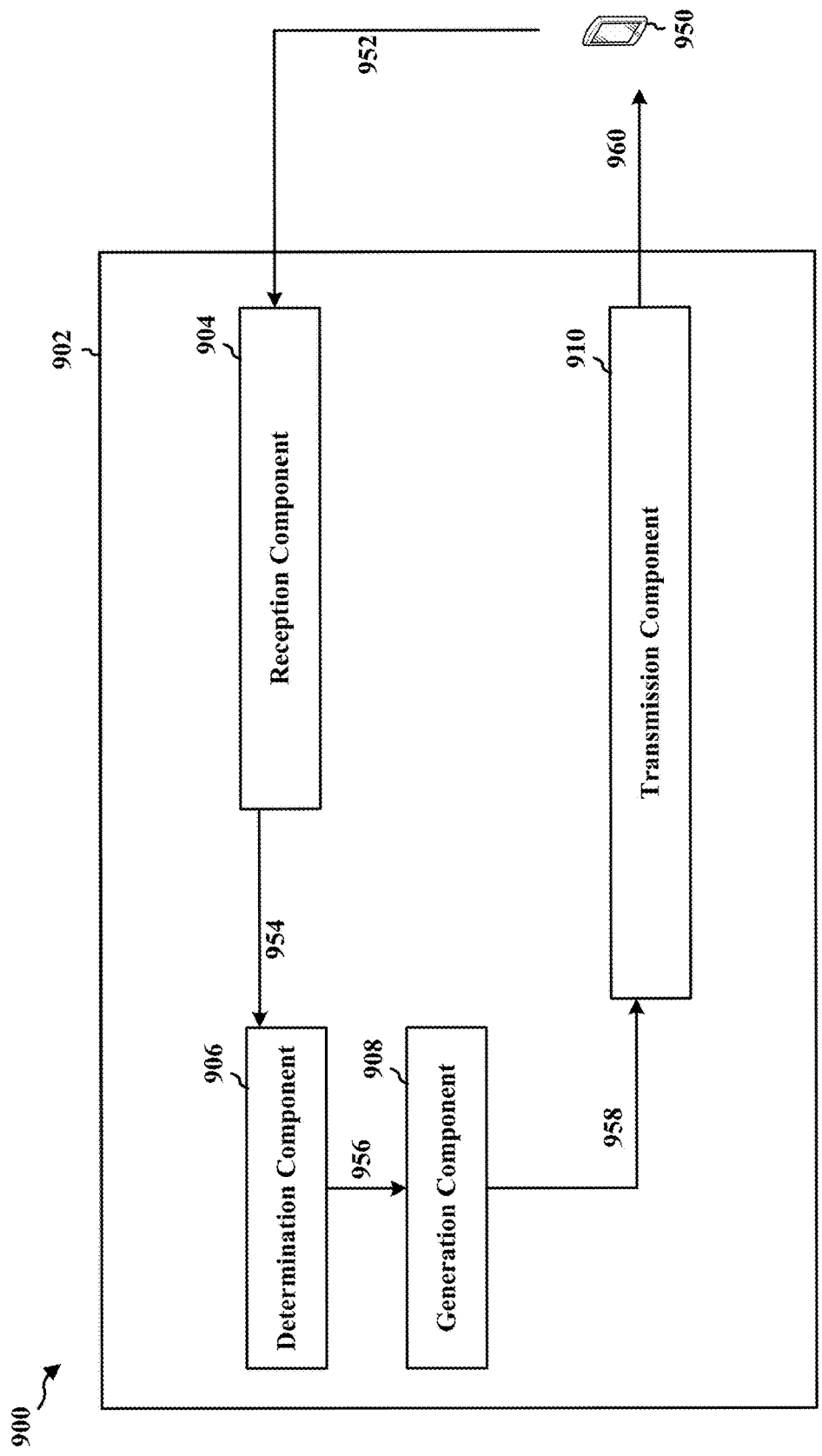
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a base station. The apparatus includes a reception component 904 that may receive transmissions 952 from a UE 950, a determination component 906 that may determine to provide a MU-MIMO transmission to a plurality of UEs over a same set of resource blocks, a generation component 908 that may generate a DCI message for each UE of the plurality of UEs indicating a DL grant of the resource blocks, each DCI message including an MU-MIMO assistance information field, and a transmission component 910 that may transmitting the generated DCI messages to the plurality of UEs.

The reception component 904 may communicate data 954 received in receive transmissions 952 from the UE 950 in the received transmissions 952 from the UE 950 to the determination component 906. The determination component 906 may signal 956 the generation component 908 that the determination component 906 has determined to provide a MU-MIMO transmission to a plurality of UEs over a same set of resource blocks. The generation component 908 may generate the DCI message for each UE of the plurality of UEs indicating a DL grant of the resource blocks. Each DCI message may include the MU-MIMO assistance information field. The generation component may communicate the DCI message 958 to the transmission component 910, which may transmitting the generated DCI messages 960 to the plurality of UEs (e.g., UE 950).

The apparatus may include additional components that perform each of the blocks of the algorithm in the aforementioned flowcharts of FIGS. 6-8. As such, each block in the aforementioned flowcharts of FIGS. 6-8 may be performed by a component and the apparatus may include one or more of those components (particularly FIG. 6). The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
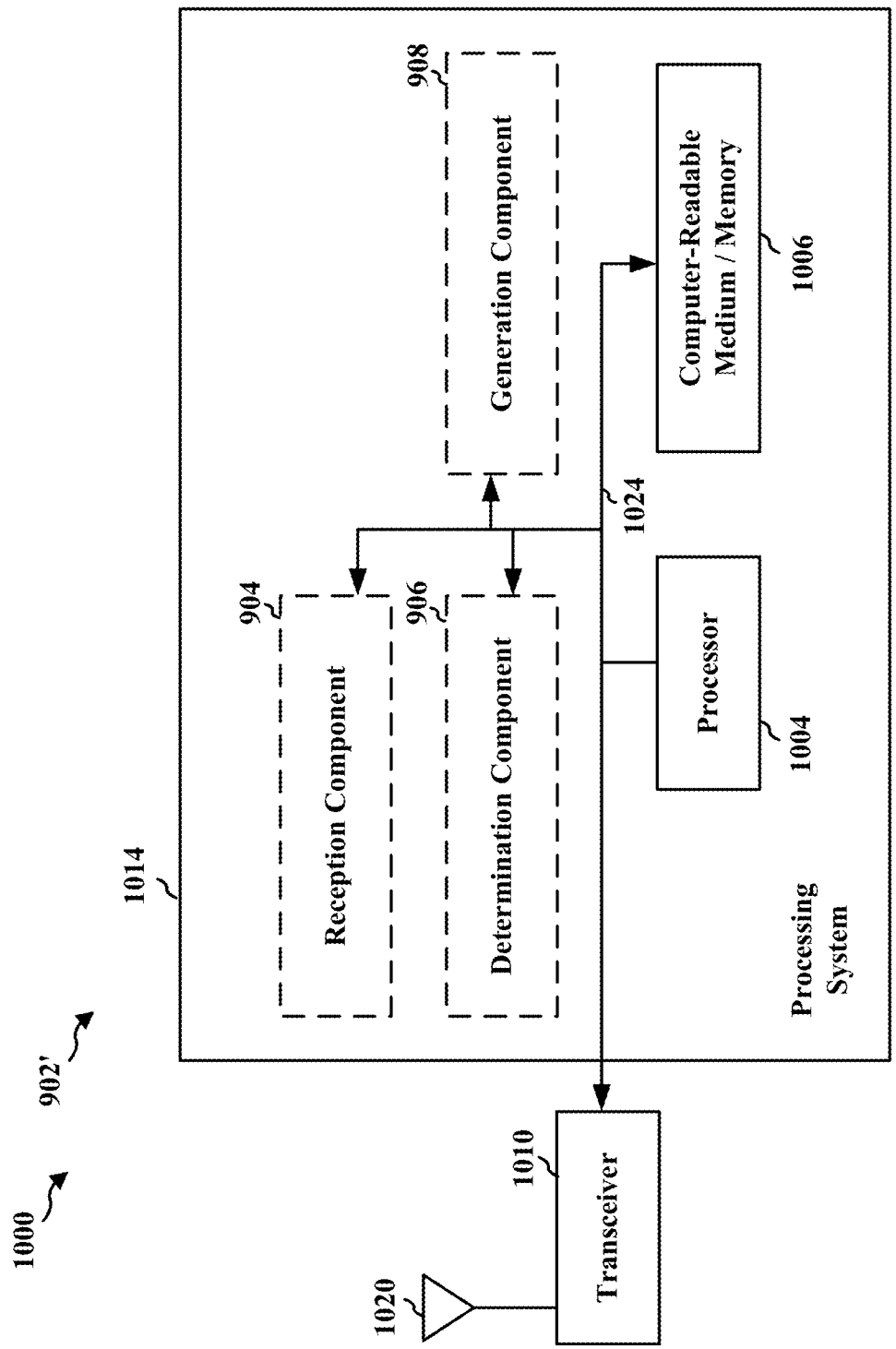
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component may receive data from transmissions, e.g., from UEs. In addition, the transceiver 1010 receives information from the processing system 1014, specifically the transmission component may transmit data, e.g., to UEs, such as DCI messages, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375.

In one configuration, the apparatus 902/902' for wireless communication includes means for determining to provide a MU-MIMO transmission to a plurality of UEs over a same set of resource blocks, means for generating a DCI message for each UE of the plurality of UEs indicating a DL grant of the resource blocks, each DCI message comprising an MU-MIMO assistance information field, and means for transmitting the generated DCI messages to the plurality of UEs. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
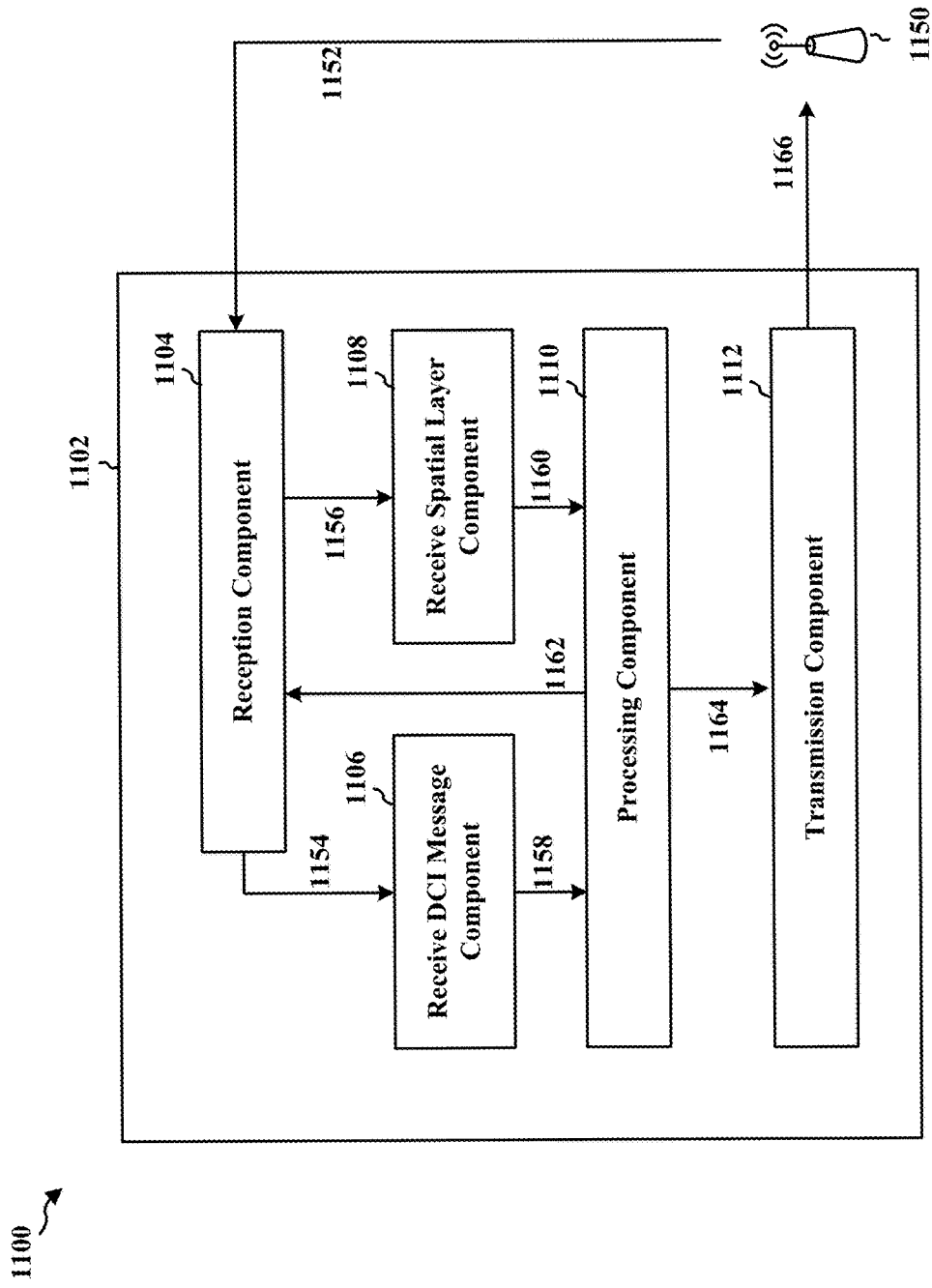
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104 that receives signals 1152 from a base station 1150, a receive DCI message component 1106 that may receive a DCI message 1154 indicating a DL grant of a set of resource blocks shared by other UEs for MU-MIMO transmission, the DCI message comprising an MU-MIMO assistance information field, a receive spatial layer component 1108 that may receive the set of resource blocks 1156 on at least one spatial layer of the MU-MIMO transmission based on the DL grant, and a processing component 1110 that may process the set of resource blocks based on the MU-MIMO assistance information field. For example, the processing component 1110 may perform channel estimation. The received DCI messages 1154 and the set of resource blocks may be signaled to the processing component 1158, 1160. Results of the processing 1162, 1164 may be communicated to the reception component and/or the transmission component 1112. The transmission component 1112 may transmit 1166 to the base station 1150.

The apparatus may include additional components that perform each of the blocks of the algorithm in the aforementioned flowcharts of FIGS. 6-8. As such, each block in the aforementioned flowcharts of FIGS. 6-7 may be performed by a component and the apparatus may include one or more of those components (particularly FIG. 7). The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
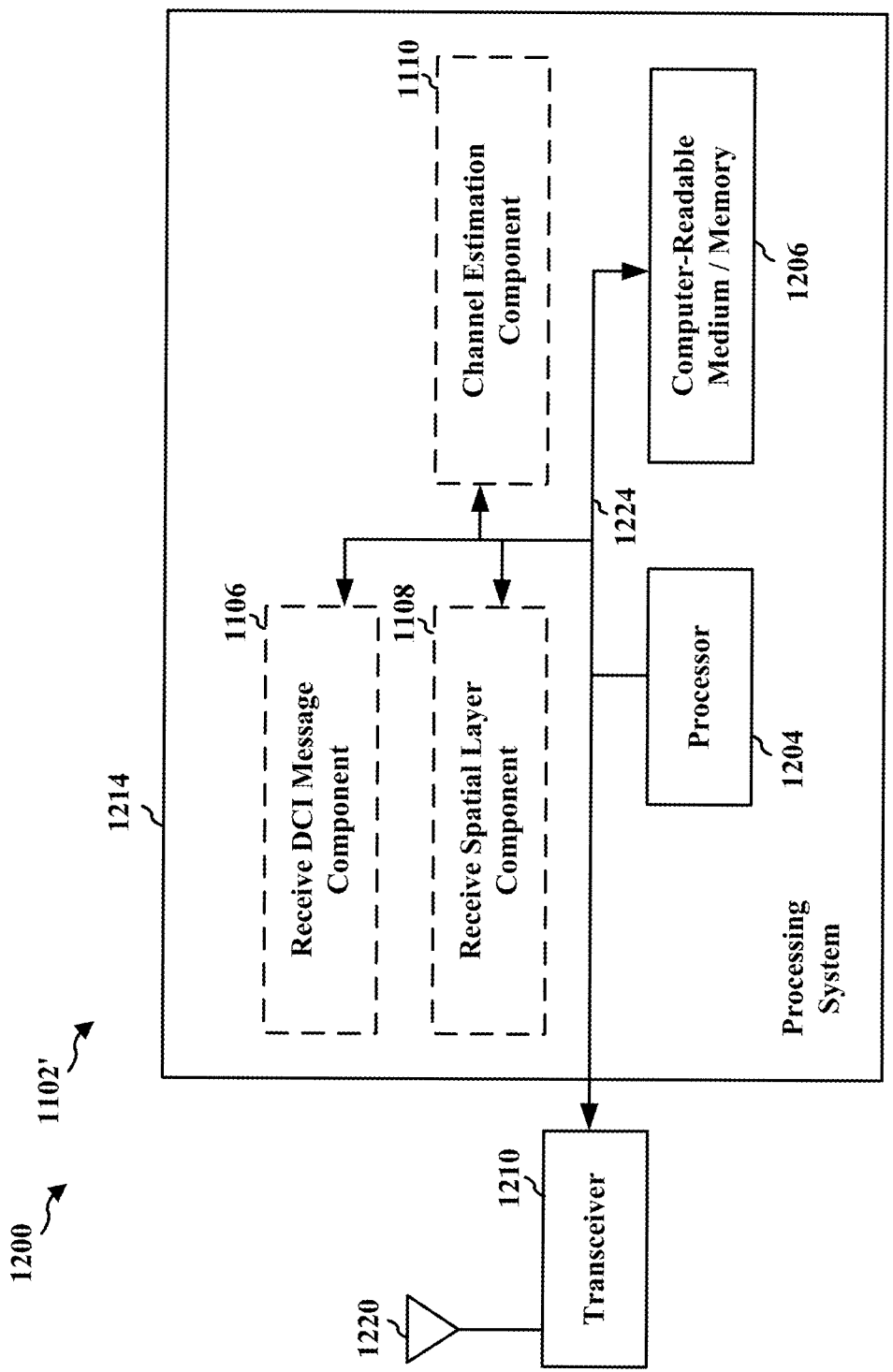
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component receives signals from a base station. In addition, the transceiver 1210 receives information from the processing system 1214, specifically the transmission component may transmit signals to a base station, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for receiving a DCI message indicating a DL grant of a set of resource blocks shared by other UEs for MU-MIMO transmission, the DCI message comprising an MU-MIMO assistance information field, means for receiving the set of resource blocks on at least one spatial layer of the MU-MIMO transmission based on the DL grant, and means for processing the set of resource blocks based on the MU-MIMO assistance information field.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

An aspect may be a method of wireless communication, including receiving a DCI message, and attempting to decode the DCI message based on a DCI message length.

In an aspect, the attempting to decode comprises monitoring a search space based on a format of the DCI message.

In an aspect, the monitoring the search space may include determining the DCI message length and determining a number of decoding candidates based on the DCI message length. The attempt to decode the DCI message may be based on the determined number of decoding candidates.

In an aspect, the monitoring the search space further may include determining a set of aggregation levels based on the DCI length. The number of decoding candidates for each aggregation level may be based on the set of determined aggregation levels.

In an aspect, an apparatus for wireless communication includes a memory and at least one processor coupled to the memory. The at least one processor may be configured to: receive a downlink control information (DCI) message and attempt to decode the DCI message based on a DCI message length.

In an aspect, the at least one processor may be configured to attempt to decode by monitoring a search space based on a format of the DCI message.

In an aspect, monitoring the search space may include determining the DCI message length and determining a number of decoding candidates based on the DCI message length. The attempt to decode the DCI message may be based on the determined number of decoding candidates.

In an aspect, monitoring the search space further includes determining a set of aggregation levels based on the DCI length, wherein the number of decoding candidates for each aggregation level is based on the set of determined aggregation levels.

In an aspect, an apparatus for wireless communication includes means for receiving a DCI message and means for attempting to decode the DCI message based on a DCI message length.

In an aspect, the means for attempting to decode may be configured to monitor a search space based on a format of the DCI message.

In an aspect, the means for attempting to decode may be configured to monitor the search space by: determining the DCI message length and determining a number of decoding candidates based on the DCI message length. The attempt to decode the DCI message may be based on the determined number of decoding candidates.

In an aspect, the means for attempting to decode may be further configured to monitor the search space by: determining a set of aggregation levels based on the DCI length. The number of decoding candidates for each aggregation level may be based on the set of determined aggregation levels.

In an aspect, a computer-readable medium storing computer executable code, may include code to: receive a DCI message and attempt to decode the DCI message based on a DCI message length.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   determining to provide a multi-user multiple-input-multiple-output (MU-MIMO) transmission to a plurality of user equipments (UEs) over a same set of resource blocks;
   generating a downlink control information (DCI) message for each UE of the plurality of UEs indicating a downlink (DL) grant of the set of resource blocks, each DCI message comprising an MU-MIMO assistance information field; and
   transmitting the generated DCI messages to the plurality of UEs;
   wherein each DCI message indicates a spatial layer assignment for a corresponding UE in the MU-MIMO transmission; and
   wherein the MU-MIMO assistance information field indicates, for the corresponding UE, whether one or more other spatial layers are assigned to at least one other UE.

2. The method of claim 1, wherein each DCI message indicates an orthogonal cover coding (OCC) for the corresponding UE in the MU-MIMO transmission, and wherein the MU-MIMO assistance information field provides the corresponding UE with interference information to perform data reception.

3. The method of claim 2, wherein the MU-MIMO assistance information field further indicates a modulation order for each other spatial layer of the one or more other spatial layers of the MU-MIMO transmission.

4. The method of claim 3, wherein the MU-MIMO assistance information field comprises a set of bits indicating whether the one or more other spatial layers are assigned to the at least one other UE and the modulation order for each other spatial layer of the one or more other spatial layers assigned to the at least one other UE, and wherein the modulation order for each other spatial layer indicates one of quadrature phase shift keying (QPSK) modulation, 16 quadrature amplitude modulation (QAM), 64 QAM, or 256 QAM.

5. The method of claim 3, wherein the MU-MIMO assistance information field comprises a set of bits indicating whether the one or more other spatial layers are assigned to the at least one other UE and the modulation order for each other spatial layer of the one or more other spatial layers assigned to the at least one other UE, and wherein the modulation order for each other spatial layer indicates one of quadrature phase shift keying (QPSK) modulation, 16 quadrature amplitude modulation (QAM), 64 or higher QAM.

6. The method of claim 5, wherein the one or more other spatial layers comprise two or fewer other spatial layers assigned to the at least one other UE, and the modulation order for each other spatial layer of the two or fewer other spatial layers indicates one of QPSK modulation, 16 QAM, 64 QAM, or 256 QAM.

7. The method of claim 2, wherein the MU-MIMO assistance information field comprises a set of bits indicating whether the one or more other spatial layers are assigned to the at least one other UE.

8. The method of claim 7, wherein the one or more other spatial layers comprise one other spatial layer, and the set of bits further indicate whether the one other spatial layer is assigned and indicate a modulation order of the one other spatial layer for MU-MIMO transmission.

9. The method of claim 1, wherein the MU-MIMO assistance information field comprises a set of bits indicating whether one or more other spatial layers are assigned to at least one other UE and a modulation order for each other spatial layer, including other spatial layers associated with a different scrambling identity, in the MU-MIMO transmission, and wherein the modulation order for each other spatial layer indicates one of quadrature phase shift keying (QPSK) modulation, 16 quadrature amplitude modulation (QAM), 64 QAM, or 256 QAM.

10. The method of claim 1, wherein the MU-MIMO assistance information field indicates a usage of a non-orthogonal demodulation reference signal (DMRS) port.

11. The method of claim 10, wherein the MU-MIMO assistance information field comprises a set of bits, each bit of the set of bits indicating the usage of one non-orthogonal DMRS port, or comprises 1 bit indicating whether any non-orthogonal DMRS port is used.

12. A method of wireless communication by a user equipment (UE), comprising:
   receiving a downlink control information (DCI) message indicating a downlink (DL) grant of a set of resource blocks shared by other UEs for a multi-user multiple-input-multiple-output (MU-MIMO) transmission, the DCI message comprising an MU-MIMO assistance information field;
   receiving the set of resource blocks on at least one spatial layer of the MU-MIMO transmission based on the DL grant; and
   processing the set of resource blocks based on the MU-MIMO assistance information field;
   wherein the DCI message indicates an assignment of the at least one spatial layer for the UE in the MU-MIMO transmission; and
   wherein the MU-MIMO assistance information field indicates whether one or more other spatial layers of the MU-MIMO transmission are assigned to at least one other UE.

13. The method of claim 12, wherein the DCI message indicates an assignment of an orthogonal cover coding (OCC) for the UE in the MU-MIMO transmission.

14. The method of claim 13, wherein the MU-MIMO assistance information field further indicates a modulation order for each other spatial layer of the one or more other spatial layers assigned to the at least one other UE for the MU-MIMO transmission.

15. The method of claim 14, wherein the modulation order for the each other spatial layer indicates one of quadrature phase shift keying (QPSK) modulation, 16 quadrature amplitude modulation (QAM), 64 QAM, or 256 QAM.

16. The method of claim 14, wherein the modulation order for the each other spatial layer indicates one of quadrature phase shift keying (QPSK) modulation, 16 quadrature amplitude modulation (QAM), 64 or higher QAM.

17. The method of claim 16, wherein the one or more other spatial layers comprise two or fewer other spatial layers assigned to the at least one other UE, and the modulation order for each other spatial layer of the two or fewer other spatial layers indicates one of QPSK modulation, 16 QAM, 64 QAM, or 256 QAM.

18. The method of claim 13, wherein the MU-MIMO assistance information field comprises 3 bits indicating whether the one or more other spatial layers are assigned to the at least one other UE.

19. The method of claim 18, wherein the one or more other spatial layers comprise one other spatial layer, and the 3 bits further indicate whether the one other spatial layer is assigned and the modulation order of the other spatial layer for MU-MIMO transmission.

20. The method of claim 12, wherein the MU-MIMO assistance information field indicates whether one or more other spatial layers are assigned to at least one other UE and a modulation order for each other spatial layer of the one or more other spatial layers, including other spatial layers associated with a different scrambling identity, in the MU-MIMO transmission, and wherein the modulation order for each other spatial layer indicates one of quadrature phase shift keying (QPSK) modulation, 16 quadrature amplitude modulation (QAM), 64 QAM, or 256 QAM.

21. The method of claim 12, wherein the MU-MIMO assistance information field indicates a usage of a non-orthogonal demodulation reference signal (DMRS) port.

22. The method of claim 21, wherein the MU-MIMO assistance field comprises a set of bits, a bit of the set of bits indicating the usage of one non-orthogonal DMRS port or comprises 1 bit to indicate whether any non-orthogonal DMRS port is used.

23. The method of claim 12, wherein the at least one spatial layer comprises a demodulation reference signal, and wherein the processing comprises:
   performing channel estimation based on the received demodulation reference signal and the MU-MIMO assistance information field.

24. An apparatus for wireless communication, comprising:
   a memory; and
   at least one processor coupled to the memory and configured to:
      determine to provide a multi-user multiple-input-multiple-output (MU-MIMO) transmission to a plurality of user equipments (UEs) over a same set of resource blocks;
      generate a downlink control information (DCI) message for each UE of the plurality of UEs indicating a downlink (DL) grant of the set of resource blocks, each DCI message comprising an MU-MIMO assistance information field; and
      transmit the generated DCI messages to the plurality of UEs;
   wherein each DCI message indicates a spatial layer assignment for a corresponding UE in the MU-MIMO transmission; and wherein the MU-MIMO assistance information field indicates, for the corresponding UE, whether one or more other spatial layers are assigned to at least one other UE.

25. The apparatus of claim 24, wherein each DCI message indicates an orthogonal cover coding (OCC) for the corresponding UE in the MU-MIMO transmission, and wherein the MU-MIMO assistance information field provides the corresponding UE with interference information to perform data reception.

26. The apparatus of claim 25, wherein the MU-MIMO assistance information field further indicates a modulation order for each other spatial layer of the one or more other spatial layers of the MU-MIMO transmission.

27. The apparatus of claim 26, wherein the MU-MIMO assistance information field comprises a set of bits indicating whether the one or more other spatial layers are assigned to the at least one other UE and the modulation order for each other spatial layer of the one or more other spatial layers assigned to the at least one other UE, and wherein the modulation order for each other spatial layer indicates one of quadrature phase shift keying (QPSK) modulation, 16 quadrature amplitude modulation (QAM), 64 QAM, or 256 QAM.

28. The apparatus of claim 26, wherein the MU-MIMO assistance information field comprises a set of bits indicating whether the one or more other spatial layers are assigned to the at least one other UE and the modulation order for each other spatial layer of the one or more other spatial layers assigned to the at least one other UE, and wherein the modulation order for each other spatial layer indicates one of quadrature phase shift keying (QPSK) modulation, 16 quadrature amplitude modulation (QAM), 64 or higher QAM.

29. The apparatus of claim 28, wherein the one or more other spatial layers comprise two or fewer other spatial layers assigned to the at least one other UE, and the modulation order for each other spatial layer of the two or fewer other spatial layers indicates one of QPSK modulation, 16 QAM, 64 QAM, or 256 QAM.

30. The apparatus of claim 28, wherein the MU-MIMO assistance information field comprises a set of bits indicating whether the one or more other spatial layers are assigned to the at least one other UE.

31. The apparatus of claim 30, wherein the one or more other spatial layers comprise one other spatial layer, and the set of bits further indicate whether the one other spatial layer is assigned and the modulation order of the one other spatial layer for MU-MIMO transmission.

32. The apparatus of claim 24, wherein the MU-MIMO assistance information field comprises a set of bits indicating whether one or more other spatial layers are assigned to at least one other UE and a modulation order for each other spatial layer, other including spatial layers associated with a different scrambling identity, in the MU-MIMO transmission, and wherein the modulation order for each other spatial layer indicates one of quadrature phase shift keying (QPSK) modulation, 16 quadrature amplitude modulation (QAM), 64 QAM, or 256 QAM.

33. The apparatus of claim 24, wherein the MU-MIMO assistance information field indicates a usage of a non-orthogonal demodulation reference signal (DMRS) port.

34. The apparatus of claim 33, wherein the MU-MIMO assistance information field comprises a set of bits, each bit of the set of bits indicating the usage of one non-orthogonal DMRS port, or comprises 1 bit indicating whether any non-orthogonal DMRS port is used.

35. A user equipment (UE) for wireless communication, comprising:
a memory; and
at least one processor coupled to the memory and configured to:
receive a downlink control information (DCI) message indicating a downlink (DL) grant of a set of resource blocks shared by other UEs for multi-user multiple-input-multiple-output (MU-MIMO) transmission, the DCI message comprising an MU-MIMO assistance information field;
receive the set of resource blocks on at least one spatial layer of the MU-MIMO transmission based on the DL grant; and
process the set of resource blocks based on the MU-MIMO assistance information field;
wherein the DCI message indicates an assignment of the at least one spatial layer for the UE in the MU-MIMO transmission; and
wherein the MU-MIMO assistance information field indicates whether one or more other spatial layers of the MU-MIMO transmission are assigned to at least one other UE.

36. The UE of claim 35, wherein the DCI message indicates an orthogonal cover coding (OCC) for the UE in the MU-MIMO transmission.

37. The UE of claim 36, wherein the MU-MIMO assistance information field further indicates a modulation order for each other spatial layer of the one or more other spatial layers assigned to the at least one other UE for the MU-MIMO transmission.

38. The UE of claim 37, wherein the modulation order for the each other spatial layer indicates one of quadrature phase shift keying (QPSK) modulation, 16 quadrature amplitude modulation (QAM), 64 QAM, or 256 QAM.

39. The UE of claim 37, wherein the modulation order for the each other spatial layer indicates one of quadrature phase shift keying (QPSK) modulation, 16 quadrature amplitude modulation (QAM), 64 or higher QAM.

40. The UE of claim 39, wherein the one or more other spatial layers comprise two or fewer other spatial layers assigned to the at least one other UE, and the modulation order for each other spatial layer of the two or fewer other spatial layers indicates one of QPSK modulation, 16 QAM, 64 QAM, or 256 QAM.

41. The UE of claim 36, wherein the MU-MIMO assistance information field comprises 3 bits indicating whether the one or more other spatial layers are assigned to the at least one other UE.

42. The UE of claim 41, wherein the one or more spatial layers comprise one spatial layer, and the 3 bits further indicate whether the one spatial layer is assigned and the modulation order of the spatial layer for MU-MIMO transmission.

43. The UE of claim 35, wherein the MU-MIMO assistance information field indicates whether one or more other spatial layers are assigned to at least one other UE and a modulation order for each other spatial layer of the one or more other spatial layers, including other spatial layers associated with a different scrambling identity, in the MU-MIMO transmission, and wherein the modulation order for each other spatial layer indicates one of quadrature phase shift keying (QPSK) modulation, 16 quadrature amplitude modulation (QAM), 64 QAM, or 256 QAM.

44. The UE of claim 35, wherein the MU-MIMO assistance information field indicates a usage of a non-orthogonal demodulation reference signal (DMRS) port.

45. The UE of claim 44, wherein the MU-MIMO assistance field comprises a set of bits, a bit of the set of bits indicating the usage of one non-orthogonal DMRS port or comprises 1 bit to indicate whether any non-orthogonal DMRS port is used.

46. The UE of claim 35, wherein the at least one spatial layer comprises demodulation reference signal, and wherein the at least one processor is configured to process by:
performing channel estimation based on the received demodulation reference signal and the MU-MIMO assistance information field.

47. An apparatus for wireless communication, comprising:
means for determining to provide a multi-user multiple-input-multiple-output (MU-MIMO) transmission to a plurality of user equipments (UEs) over a same set of resource blocks;
means for generating a downlink control information (DCI) message for each UE of the plurality of UEs indicating a downlink (DL) grant of the set of resource blocks, each DCI message comprising an MU-MIMO assistance information field; and
means for transmitting the generated DCI messages to the plurality of UEs;
wherein each DCI message indicates a spatial layer assignment for a corresponding UE in the MU-MIMO transmission; and
wherein the MU-MIMO assistance information field indicates, for the corresponding UE, whether one or more other spatial layers are assigned to at least one other UE.

48. A user equipment (UE) for wireless communication, comprising:
means for receiving a downlink control information (DCI) message indicating a downlink (DL) grant of a set of resource blocks shared by other UEs for a multi-user multiple-input-multiple-output (MU-MIMO) transmission, the DCI message comprising an MU-MIMO assistance information field;
means for receiving the set of resource blocks on at least one spatial layer of the MU-MIMO transmission based on the DL grant; and
means for processing the set of resource blocks based on the MU-MIMO assistance information field;
wherein the DCI message indicates an assignment of the at least one spatial layer for the UE in the MU-MIMO transmission; and
wherein the MU-MIMO assistance information field indicates whether one or more other spatial layers of the MU-MIMO transmission are assigned to at least one other UE.

49. A non-transitory computer-readable medium storing computer executable code, comprising code to:
determine to provide a multi-user multiple-input-multiple-output (MU-MIMO) transmission to a plurality of user equipments (UEs) over a same set of resource blocks;
generate a downlink control information (DCI) message for each UE of the plurality of UEs indicating a downlink (DL) grant of the set of resource blocks, each DCI message comprising an MU-MIMO assistance information field; and
transmit the generated DCI messages to the plurality of UEs;
wherein each DCI message indicates a spatial layer assignment for a corresponding UE in the MU-MIMO transmission; and
wherein the MU-MIMO assistance information field indicates, for the corresponding UE, whether one or more other spatial layers are assigned to at least one other UE.

50. A non-transitory computer-readable medium of a user equipment (UE) storing computer executable code, comprising code to:
receive a downlink control information (DCI) message indicating a downlink (DL) grant of a set of resource blocks shared by other UEs for a multi-user multiple-input-multiple-output (MU-MIMO) transmission, the DCI message comprising an MU-MIMO assistance information field;
receive the set of resource blocks on at least one spatial layer of the MU-MIMO transmission based on the DL grant; and
process the set of resource blocks based on the MU-MIMO assistance information field;
wherein the DCI message indicates an assignment of the at least one spatial layer for the UE in the MU-MIMO transmission; and
wherein the MU-MIMO assistance information field indicates whether one or more other spatial layers of the MU-MIMO transmission are assigned to at least one other UE.

* * * * *